(12) United States Patent
Kitamura et al.

(10) Patent No.: US 10,099,180 B2
(45) Date of Patent: Oct. 16, 2018

(54) WATER TREATMENT SYSTEM

(71) Applicant: Hitachi, Ltd., Tokyo (JP)

(72) Inventors: Kotaro Kitamura, Tokyo (JP);
Shinichi Yoshikawa, Tokyo (JP);
Masayuki Matsuura, Tokyo (JP);
Takanori Oshikiri, Tokyo (JP); Yusuke Okawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 15/164,990

(22) Filed: May 26, 2016

(65) Prior Publication Data

US 2016/0346735 A1  Dec. 1, 2016

(30) Foreign Application Priority Data

May 29, 2015  (JP) ................ 2015-109309

(51) Int. Cl.
*B01D 61/08*  (2006.01)
*B01D 61/06*  (2006.01)
*B01D 61/12*  (2006.01)
*B01D 61/10*  (2006.01)
*B01D 61/02*  (2006.01)
(Continued)

(52) U.S. Cl.
CPC ............ *B01D 61/08* (2013.01); *B01D 61/025* (2013.01); *B01D 61/06* (2013.01); *B01D 61/10* (2013.01); *B01D 61/12* (2013.01); *C02F 1/441* (2013.01); *B01D 2313/243* (2013.01); *B01D 2313/246* (2013.01); *B01D 2317/04* (2013.01); *B01D 2317/06* (2013.01); *C02F 2103/08* (2013.01); *C02F 2201/007* (2013.01); *C02F 2303/10* (2013.01); *Y02A 20/131* (2018.01); *Y02W 10/30* (2015.05)

(58) Field of Classification Search
CPC ............ B01D 2317/04; B01D 2317/06; B01D 61/022; B01D 61/025; B01D 61/08; B01D 61/10; B01D 61/06; B01D 61/12; C02F 1/441; C02F 2103/08; C02F 2201/007; C02F 2303/10; Y02W 10/30
See application file for complete search history.

(56) References Cited

U.S. PATENT DOCUMENTS

2012/0298578 A1* 11/2012 Herrington .......... B01D 61/022
210/636

FOREIGN PATENT DOCUMENTS

JP  2014-094359 A  5/2014

* cited by examiner

*Primary Examiner* — John Kim

(57) ABSTRACT

Provided is a seawater desalination system including reverse osmosis membrane modules each including: a reverse osmosis membrane; and a pressure vessel installing the reverse osmosis membrane, and configured to obtain permeated water and concentrated water using the reverse osmosis membranes housed in the reverse osmosis membrane modules by supplying seawater to the reverse osmosis membrane modules. The seawater desalination system includes a module group including the reverse osmosis membrane modules connected together in parallel. The seawater is supplied to each of the reverse osmosis membrane modules by being supplied to the module group through first and second seawater supply routes. The first and second seawater supply routes are each provided with a liquid transport pump configured to supply the seawater flowing through the seawater supply route to the module group.

10 Claims, 8 Drawing Sheets

(51) Int. Cl.
*C02F 1/44* (2006.01)
*C02F 103/08* (2006.01)

POSITION OF REVERSE OSMOSIS MEMBRANE MODULE 10
FROM FIRST SEAWATER SUPPLY ROUTE
(POSITION NUMBER)

WATER TREATMENT SYSTEM

BACKGROUND OF THE INVENTION

1. Field of the Invention

The present invention relates to a water treatment system.

2. Description of the Related Art

A technique for obtaining fresh water from seawater or the like using reverse osmosis membranes has been known. For example, a module group including multiple pressure vessels connected together in parallel with a membrane module inserted in each pressure vessel and with the membrane module including reverse osmosis membranes is used to obtain fresh water using the reverse osmosis membranes. The fresh water is obtained using the reverse osmosis membranes when seawater or the like is supplied to the module group.

As a related art, a technique disclosed in JP 2014-094359 A is known. JP 2014-094359 A discloses a membrane module configured to perform water filtering treatment, a pressure vessel in which the membrane module is inserted, and a water treatment system including multiple such pressure vessels connected together in parallel via pipes. Furthermore, this water treatment system includes a plate-shaped resistance body located upstream of the membrane module in each pressure vessel, and configured to increase and decrease a flow rate of raw water by giving variable resistance to the raw water while moving in a direction vertical to a direction of flow of the supplied raw water.

[Patent Literature 1] JP 2014-094359 A

SUMMARY OF THE INVENTION

To change the flow rate of raw water (water to be treated) such as seawater is a conceivable method for changing an amount of fresh water to be obtained using the water treatment system. However, a change in the flow rate of the raw water leads to a change in pressure loss of the raw water. To put it concretely, as the flow rate of the raw water becomes lower, the pressure loss in the flow of the water becomes smaller. For this reason, a difference in pressure of the raw water (a pressure loss difference) is not so large between the downstream side and the upstream side which is directly supplied with the water; and there is almost no difference between a flow rate of the raw water supplied to an upstream pressure vessel and a flow rate of the raw water supplied to a downstream pressure vessel. On the other hand, as the flow rate of the raw water becomes higher, the pressure loss in the flow of the water becomes larger. Accordingly, the flow rate of the supplied raw water is high in the upstream pressure vessel where the pressure of the water is high. Meanwhile, since the pressure loss of the water increases as the water flows farther and farther from the upstream side, the pressure of the water is low in the downstream pressure vessel, and thus the flow rate of the supplied raw water is also low in the downstream pressure vessel.

In addition, as the difference between the flow rate of the raw water supplied to the upstream pressure vessel and the flow rate of the raw water supplied to the downstream pressure vessel becomes larger, the membrane modules placed inside the pressure vessels tend to be locally fouled. To put it concretely, the reverse osmosis membranes inside the upstream pressure vessel where the amount of supplied raw water is larger is easily fouled, while the reverse osmosis membranes inside the downstream pressure vessel where the amount of supplied raw water is smaller is less easily fouled. This makes the flow rate of the seawater vary in the module group, and decreases the desalination efficiency of the water treatment system as a whole.

With this taken into consideration, JP 2014-094359 A has disclosed that the flow rate distributed among the multiple membrane modules connected together in parallel and the fluid resistance are made equal among the multiple membrane modules (see Paragraph 0016 in JP 2014-094359 A). Furthermore, in the technique disclosed in JP 2014-094359 A, the resistance body (including a movable porous plate and a fixed porous plate) is operated based on things such as a pressure difference between the supplied water and the concentrated water in order to change the flow rate of the raw water (see Paragraph 0037 in JP 2014-094359 A in particular). Therefore, the membrane module is presumably provided with a separate driving mechanism configured to drive the resistance body.

In addition, there may be a case where dirt adheres to the resistance body itself. In this case, there is likelihood that the resistance body cannot be controlled accurately based on the pressure difference between the supplied water and the concentrated water because the resistance body itself causes unexpected pressure loss.

Furthermore, the inclusion of the resistance body in the pressure vessel increases the pressure loss of the raw water. Accordingly, a liquid transport pump configured to supply the pressure vessel with the raw water is wasteful of driving force. From a viewpoint of energy saving, there is room for improvement.

The present invention has been made with the foregoing problems taken into consideration. A problem to be solved by the present invention is to provide a water treatment system capable of evenly supplying raw water to its membrane modules using a low-cost and simple facility configuration.

The inventors have made careful examinations to solve the problem, and obtain the following findings. That is, the gist of the present invention relates to a water treatment system including: reverse osmosis membrane modules each including a reverse osmosis membrane and a pressure vessel installing the reverse osmosis membrane, the water treatment system configured to obtain permeated water and concentrated water using the reverse osmosis membranes housed in the reverse osmosis membrane modules by supplying raw water to the reverse osmosis membrane modules; and a module group including the reverse osmosis membrane modules connected together in parallel, in which the raw water is supplied to each of the reverse osmosis membrane modules by being supplied to the module group through a plurality of raw water passages, and the raw water passages are each provided with a liquid transport pump configured to supply the raw water flowing through the raw water passage to the module group.

According to the present invention, it is possible to provide a water treatment system capable of evenly supplying raw water to its membrane modules using a low-cost and simple facility configuration.

DETAILED DESCRIPTION OF THE EMBODIMENTS

Embodiments of the present invention will be hereinafter described while referring to the accompanying drawings depending on the necessity. Through the drawings referred to, the same components are denoted by the same reference signs. After described in detail once, such components will no longer be described in detailed again. Each embodiment may be implemented being combined with another one as necessary.

Figure 1:
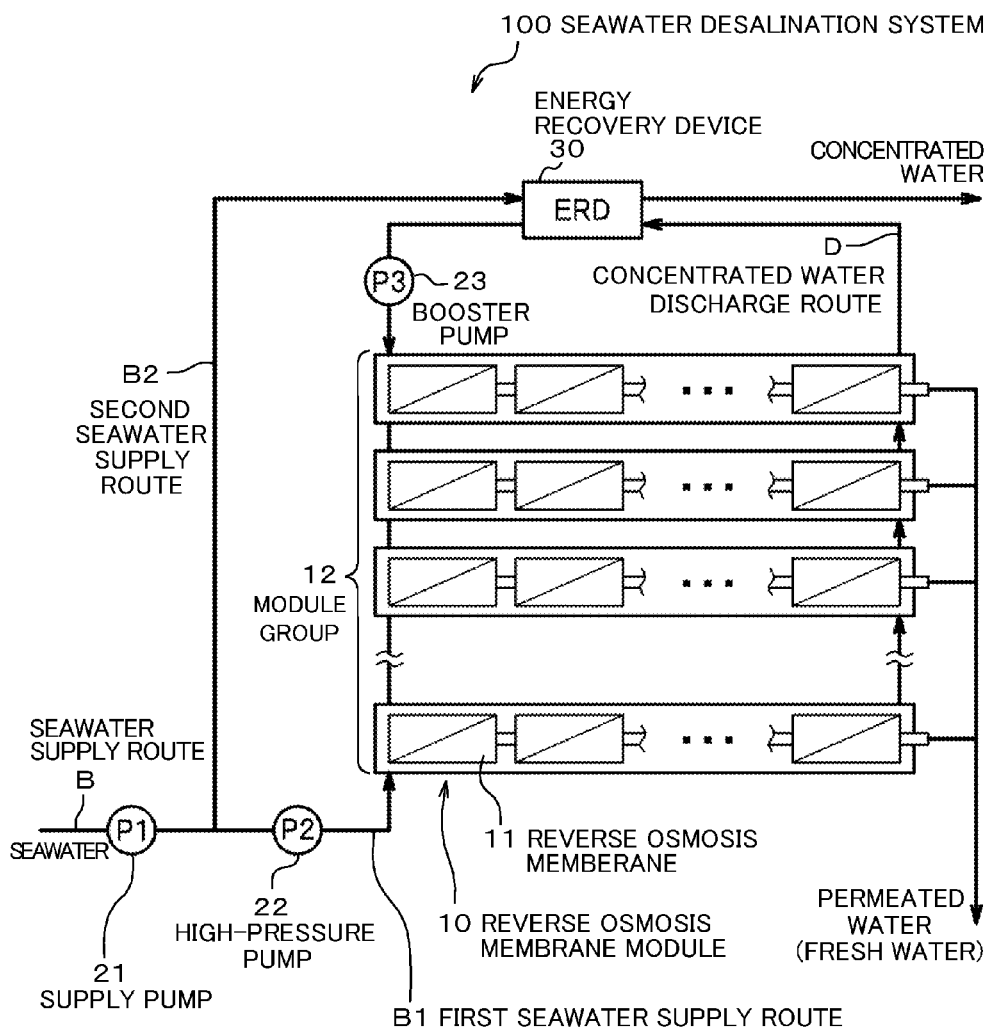
FIG. 1 is a system diagram showing a facility configuration of a seawater desalination system of a first embodiment.

FIG. 1 is a system diagram showing a facility configuration of a seawater desalination system 100 of a first embodiment. The seawater desalination system 100 separates seawater into permeated water (fresh water) and concentrated water using a reverse osmosis membrane 11. The reverse osmosis membrane 11 constitutes part of a reverse osmosis membrane module 10 by being housed in a pressure vessel. A module group 12 is formed from multiple (in FIG. 1, four) reverse osmosis membrane modules 10 under the same specification which are arranged in parallel to one another. Each reverse osmosis membrane module 10 contains multiple (in FIG. 1, three) reverse osmosis membranes 11. These reverse osmosis membranes 11 are connected together by a water collecting pipe. The seawater is supplied to each reverse osmosis membrane module 10, and the reverse osmosis membranes 11 contained in the reverse osmosis membrane module 10 obtains permeated water (fresh water) from the seawater. The thus-obtained permeated water is collected into the water collecting pipe, and is discharged from an end portion of the reverse osmosis membrane module 10.

The seawater is supplied to the module group 12 through two routes whose pressures are equal to each other. To put it specifically, the seawater taken in from a water intake (not illustrated) is supplied to the seawater desalination system 100 through a seawater supply route B. The seawater transport described above is performed using a supply pump 21. Thereafter, the seawater flowing through the seawater supply route B via the supply pump 21 is divided into two parts: one flowing through a first seawater supply route B1 and the other flowing through a second seawater supply route B2.

The seawater flowing through the first seawater supply route B1 is pressurized by a high-pressure pump 22, and is thereafter supplied to the module group 12. At this time, the seawater is supplied to a reverse osmosis membrane module 10 connected at an endmost position of the parallel-connected reverse osmosis membrane modules 10 in the module group 12.

The seawater flowing through the second seawater supply route B2 branched from the seawater supply route B is supplied to an energy recovery device 30 (hereinafter abbreviated to an "ERD 30"). The ERD 30 applies pressure of the concentrated water (whose details will be described later), which is discharged from the reverse osmosis membrane modules 10, to the thus-supplied seawater. The pressure of the seawater pressurized by the ERD 30 is further raised by a booster pump 23, and is supplied to the module group 12. At this time, the seawater is supplied to a reverse osmosis membrane module 10 connected at the other endmost position of the parallel-connected reverse osmosis membrane modules 10 in the module group 12, which is the opposite end of the module group 12 from the reverse osmosis membrane modules 10 to which the first seawater supply route B1 is connected.

The high-pressure pump 22 and the booster pump 23 are controlled by a controller (not illustrated) such that pressures of the two respective pumps 22, 23 on their outlet sides are equal to each other. Thereby, the seawater desalination system 100 supplies the seawater to the reverse osmosis membrane modules 10 which are connected at the two respective end portions of the module group 12 with the pressure of the seawater equal between the reverse osmosis membrane modules 10. This makes the seawater equally flow through the insides of the reverse osmosis membrane modules 10, and prevents dirt from locally adhering to the reverse osmosis membranes 11.

The permeated water (fresh water), as separated from the seawater by the reverse osmosis membranes 11 housed in the reverse osmosis membrane modules 10, is discharged to the outside of the seawater desalination system 100, and is made available in use depending on the necessity. Meanwhile, the concentrated water flows through a concentrated water discharge route D connected to the module group 12, and is supplied to the ERD 30. Since the pressure of the concentrated water is high, the ERD 30 supplies the pressure of the concentrated water to the seawater. Thereafter, the concentrated water whose pressure is given to the seawater by the ERD 30 is discharged to the outside of the seawater desalination system 100.

Figure 2:
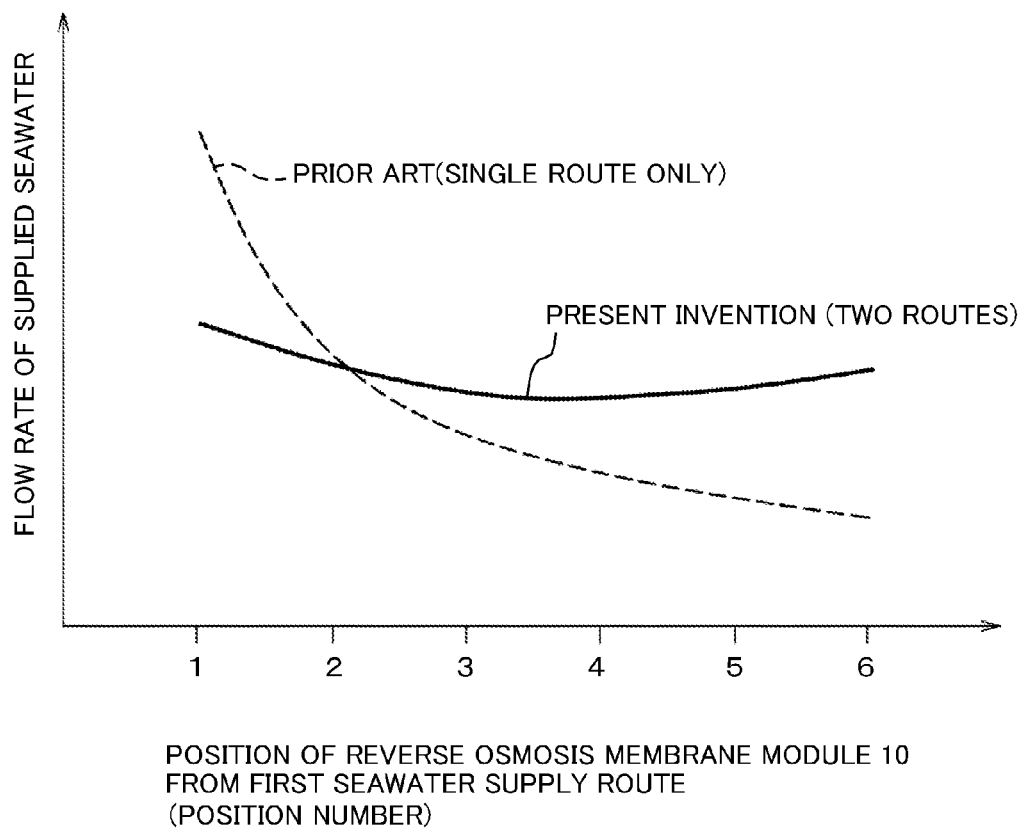
FIG. 2 is a graph showing an amount of seawater supplied to a reverse osmosis membrane module in a seawater desalination system of the first embodiment (indicated with a solid line) and an amount of seawater supplied to a reverse osmosis membrane module in a prior art seawater desalination system (indicated with a dashed line)

FIG. 2 is a graph showing an amount of seawater supplied to the reverse osmosis membrane module 10 in the seawater desalination system 100 of the first embodiment (indicated with a solid line) and an amount of seawater supplied to the reverse osmosis membrane module 10 in a prior art seawater desalination system (indicated with a dashed line). As described above, in the seawater desalination system 100 of the first embodiment indicated with the solid line, the seawater is supplied to the module group 12 through the two routes (B1, B2). On the other hand, in the prior art seawater desalination system indicated with the dashed line, the seawater is supplied through the single route. In other words, no second seawater supply route B2 is formed in the prior art seawater desalination system.

Furthermore, the horizontal axis in FIG. 2 represents a position of each reverse osmosis membrane module 10 from the first seawater supply route B1 as a starting point. For example, among the reverse osmosis membrane modules 10 included in the module group 12 (see FIG. 1), the reverse osmosis membrane module 10 to which the first seawater supply route B1 is directly connected is represented by a "first reverse osmosis membrane module 10 (in a first stage)" in FIG. 2.

As shown in FIG. 2, in the prior art seawater desalination system which supplies the seawater through the single route, the amount of supplied seawater is larger in the reverse osmosis membrane module 10 to which the seawater is directly supplied (the first reverse osmosis membrane module 10) than in any other reverse osmosis membrane module 10. As the position of the reverse osmosis membrane module 10 becomes farther from the first seawater supply route B1 (as the number on the horizontal axis becomes larger), the flow rate of seawater supplied to the reverse osmosis membrane module 10 becomes lower. As a result, the flow rate of the supplied seawater varies among the reverse osmosis membrane modules 10 included in the module group 12.

Meanwhile, in the present invention in which the seawater is supplied through the two routes, roughly the same amount of seawater is supplied to each reverse osmosis membrane module 10 regardless of where the reverse osmosis membrane module 10 is placed in the module group 12. This inhibits the flow rate of the supplied seawater from varying among the reverse osmosis membrane modules 10 included the module group 12. This is because the seawater is equally supplied to the farthest reverse osmosis membrane module 10 where the flow rate of the supplied seawater would be otherwise low (the sixth reverse osmosis membrane module 10 in FIG. 2). Furthermore, since the flow rate of the supplied seawater is inhibited from varying among the reverse osmosis membrane modules 10, local adhesion of dirt due to the difference in the flow rate is inhibited, and a reduction in the efficiency of the desalination of the seawater desalination system 100 as a whole is inhibited.

Moreover, in order to maintain the reverse osmosis membrane modules 10, for example, lid members and the like are detached from the reverse osmosis membrane modules 10, and the reverse osmosis membranes 11 are taken out of the reverse osmosis membrane modules 10. For this reason, it is desirable that the seawater supply pipes be connected to the reverse osmosis membrane modules 10 in a way that the lid members are detachable. Meanwhile, in the prior art technique, the seawater supply port is provided in the vicinity of the middle of the module group 12 with the pressure loss taken into consideration so that the seawater can be supplied to each reverse osmosis membrane module at the same flow rate. For this reason, the prior art technique makes it difficult to detach the lid members. In contrast, the seawater desalination system 100 of the first embodiment is capable of supplying the seawater to each reverse osmosis membrane module 10 at the same flow rate using the high-pressure pump 22 and the booster pump 23. This increases the freedom of the seawater supply ports, and accordingly makes it easy to detach the lid members. Thereby, it is easy to maintain the reverse osmosis membrane modules 10.

Moreover, the module group 12 is formed by connecting the multiple reverse osmosis membrane modules 10 under the same specification together in parallel. Since the reverse osmosis membrane modules 10 under the same specification can be used for the module group 12, commercially-available reverse osmosis membrane modules can be used to form the module group 12, making it possible to reduce setting costs.

Figure 3:
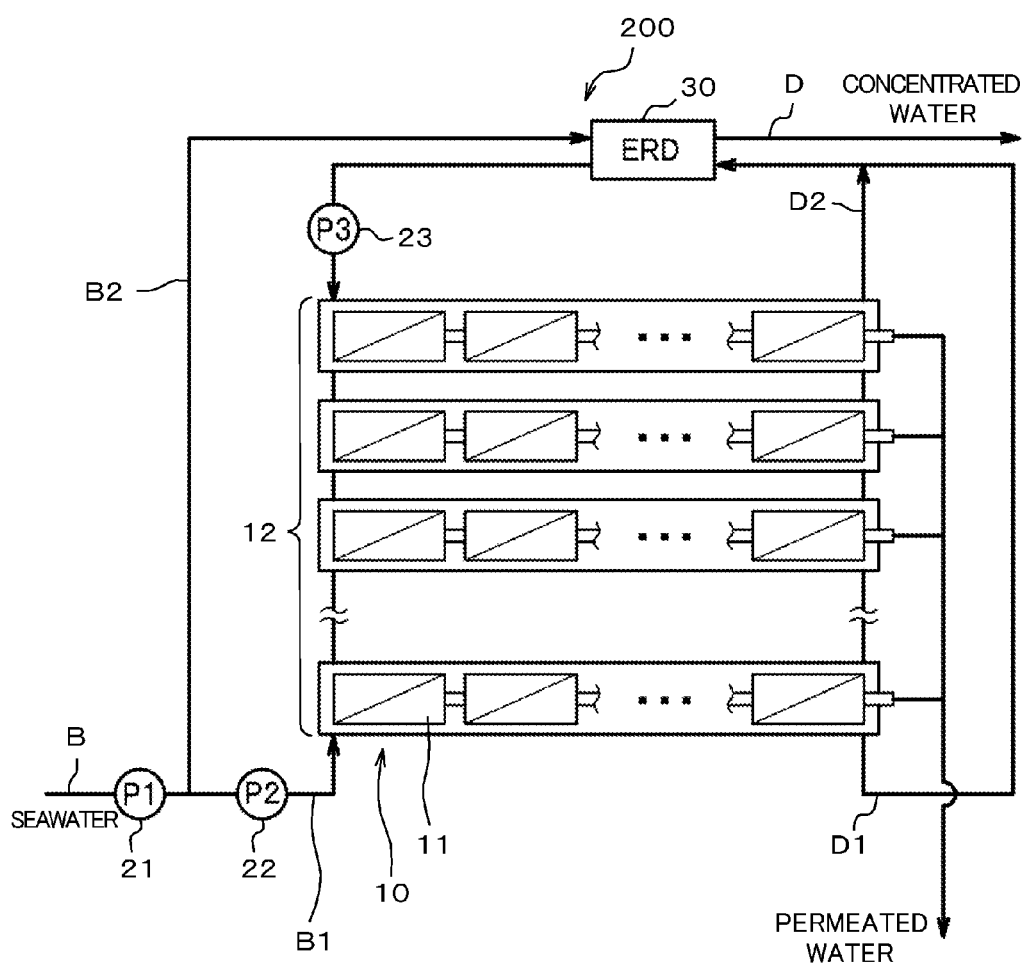
FIG. 3 is a system diagram showing a facility configuration of a seawater desalination system of a second embodiment.

FIG. 3 is a system diagram showing a facility configuration of a seawater desalination system 200 of a second embodiment. Although the seawater desalination system 100 is configured to discharge the concentrated water from the reverse osmosis membrane modules 10 through the single route (the concentrated water discharge route D) alone, the seawater desalination system 200 shown in FIG. 3 is configured to discharge the concentrated water therefrom through two routes. To put it concretely, in the seawater desalination system 200, a first concentrated water discharge route D1 and a second concentrated water discharge route D2 are formed to discharge the concentrated water from the module group 12. Of the two routes, the first concentrated water discharge route D1 is connected to the reverse osmosis membrane module 10 to which the first seawater supply route B1 is connected. Meanwhile, the second concentrated water discharge route D2 is connected to the reverse osmosis membrane module 10 to which the second seawater supply route B2 is connected.

The concentrated water pressure need not be controlled as precisely as the seawater pressure. For this reason, even the discharge using the single route alone like in the seawater desalination system 100 makes it possible to operate the seawater desalination system with a satisfactory efficiency. However, the discharge employing the two routes as in the case shown in FIG. 3 makes it possible for an almost same amount of concentrated water to flow through each reverse osmosis membrane module 10 by keeping the pressure loss from the concentrated water pressure equal among the reverse osmosis membrane modules 10. Thereby, the flow rate of the seawater to be passed through each reverse osmosis membrane 11 can be made almost equal among the reverse osmosis membrane modules 10 with higher precision, and it is possible to inhibit dirt from locally adhering to the reverse osmosis membranes 11 more securely.

Figure 4:
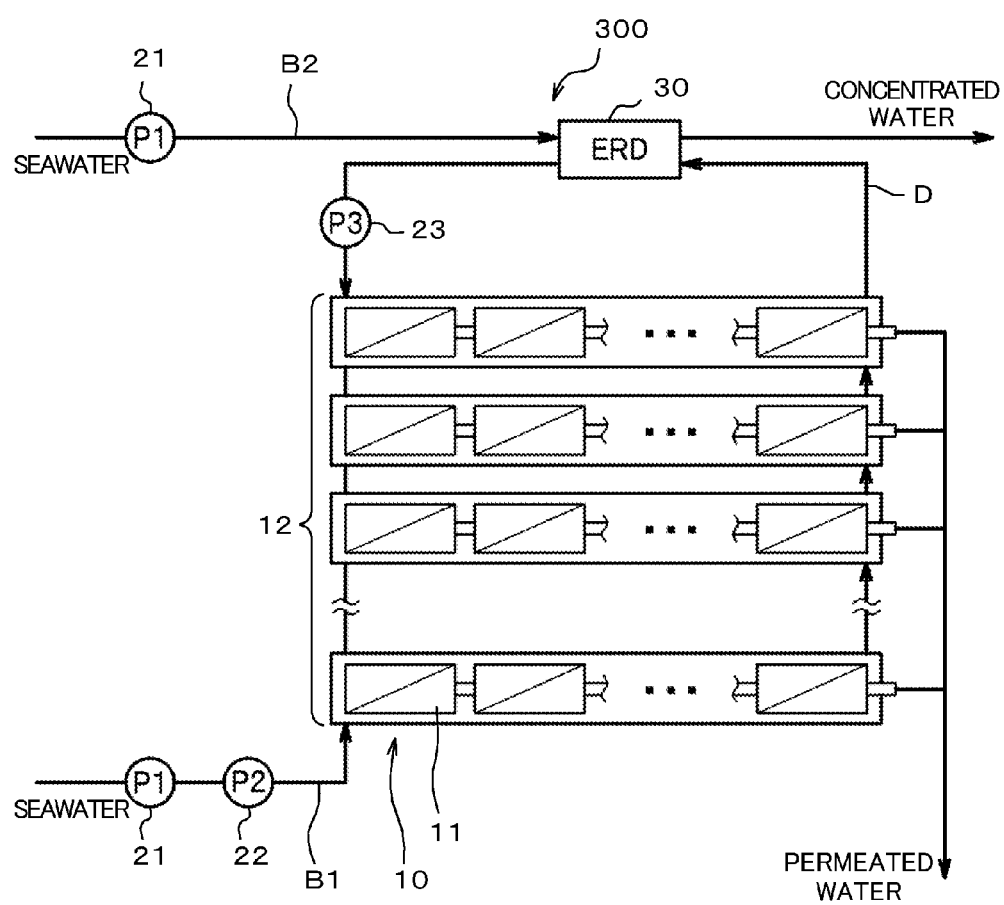
FIG. 4 is a system diagram showing a facility configuration of a seawater desalination system of a third embodiment.

FIG. 4 is a system diagram showing a facility configuration of a seawater desalination system 300 of a third embodiment. In the aforementioned seawater desalination system 100, the seawater taken in by the single route (the seawater supply route B) alone is separated into parts respectively flowing through the two routes (the first seawater supply route B1 and the second seawater supply route B2), which are thereafter supplied to the module group 12. In contrast, in the seawater desalination system 300 shown in FIG. 4, the first seawater supply route B1 and the second seawater supply route B2 are formed independently, but not by dividing the seawater supply route B into the two. Furthermore, in the seawater desalination system 300, the supply pump 21 is provided to each of the first and second seawater supply routes B1, B2 which are mutually independent from each other.

Since the supply pump 21 is provided to each of the first and second seawater supply routes B1, B2, the ERD 30 and the high-pressure pump 22 can be given pressures respectively suitable for the ERD 30 and the high-pressure pump 22. Thereby, the efficiency of the seawater desalination system 300 can be increased more.

Figure 5:
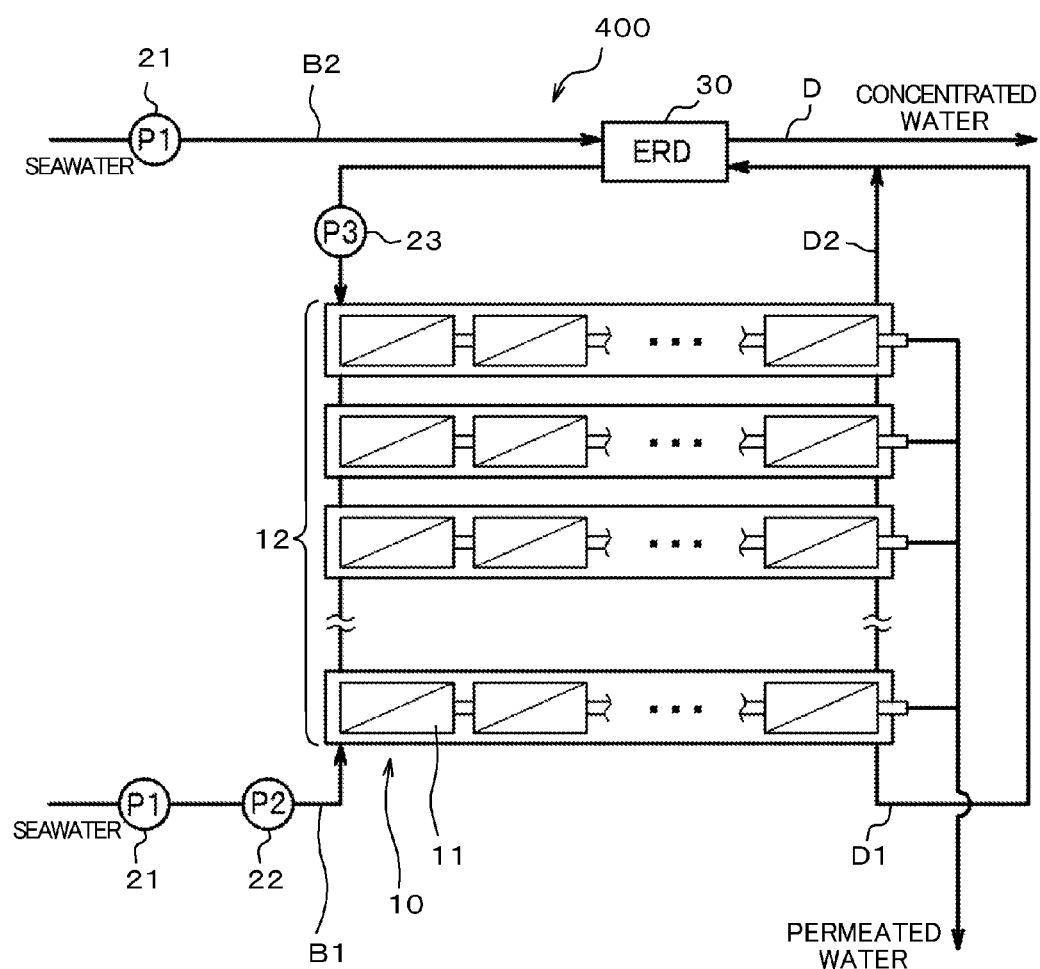
FIG. 5 is a system diagram showing a facility configuration of a seawater desalination system of a fourth embodiment.

FIG. 5 is a system diagram showing a facility configuration of a seawater desalination system 400 of a fourth embodiment. In the seawater desalination system 400 shown in FIG. 5, the seawater is supplied through two mutually-independent routes, and the concentrated water is discharged through two mutually-independent routes as well. To put it concretely, like in the seawater desalination system 300 (see FIG. 4), the seawater to be supplied to the module group 12 flows through the first and second seawater supply routes B1, B2 which are mutually independent from each other. In addition like in the seawater desalination system 200 (see FIG. 3), the concentrated water to be discharged from the module group 12 is discharged to the outside after flowing through the first and second concentrated water discharge routes D1, D2.

Since the seawater is supplied through the two routes and the concentrated water is discharged through the two routes as well, the seawater can be evenly supplied to the reverse osmosis membrane modules 10, and it is possible to inhibit dirt from locally adhering to the reverse osmosis membranes 11 more securely. Thereby, the seawater desalination system 400 can be operated particularly with high efficiency.

Figure 6:
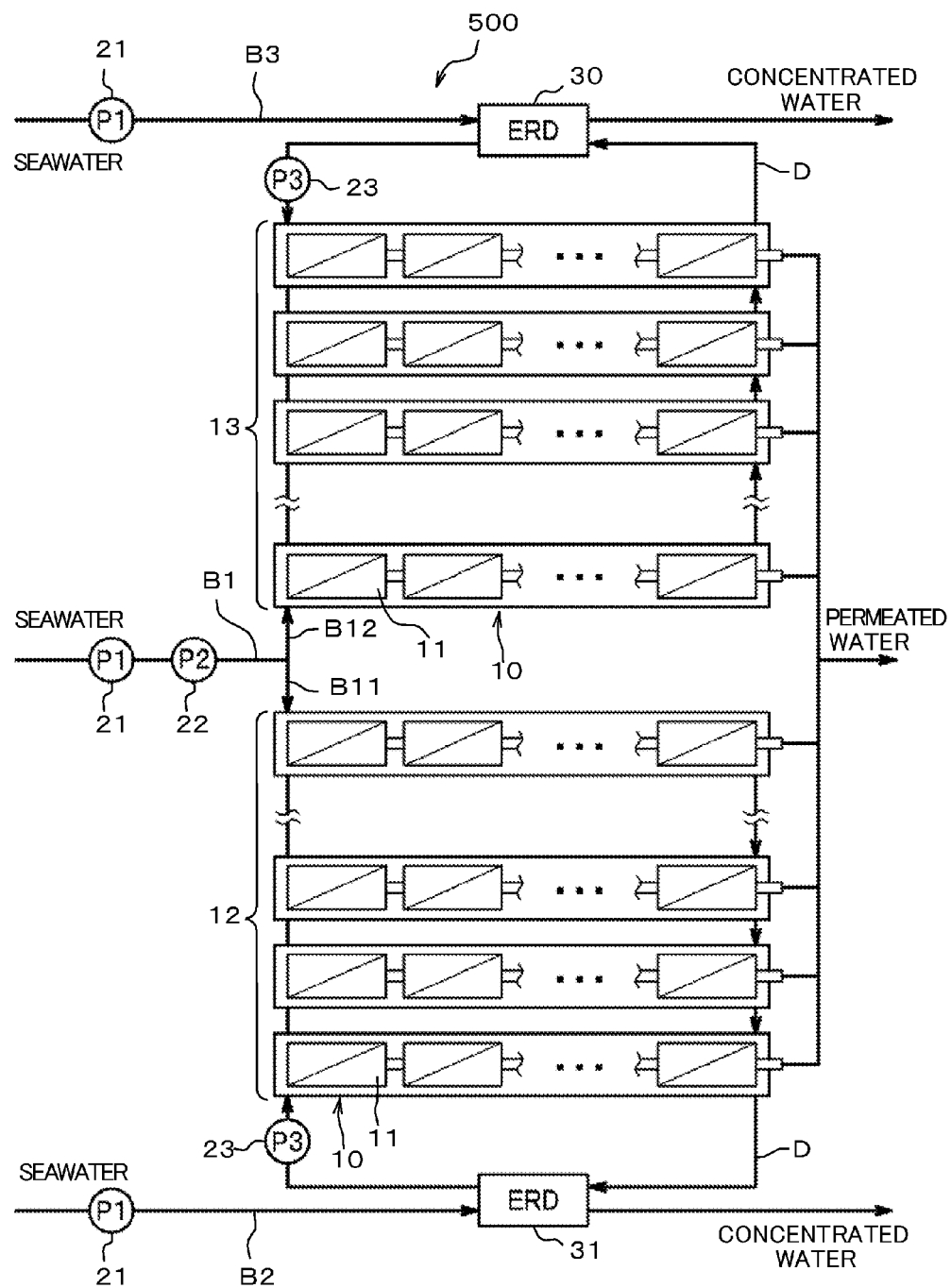
FIG. 6 is a system diagram showing a facility configuration of a seawater desalination system of a fifth embodiment.

FIG. 6 is a system diagram showing a facility configuration of a seawater desalination system 500 of a fifth embodiment. The seawater desalination systems 100 to 400 each include the only one module group 12 obtained by connecting the multiple reverse osmosis membrane modules 10 together in parallel. Meanwhile, the seawater desalination system 500 shown in FIG. 6 includes two module groups 12, 13 under the same specification arranged in parallel.

In the seawater desalination system 500, the seawater is supplied to the two module groups 12, 13 through three routes (a first seawater supply route B1, a second seawater supply route B2 and a third seawater supply route B3). These three routes are each provided with an independently-controllable supply pump 21. Incidentally, the first seawater supply route B1 of the three routes includes branched-off first seawater supply routes B11, B12 formed therein to divide the seawater having passed through the supply pump 21 and the high-pressure pump 22 into two parts to be respectively supplied to the two module groups 12, 13. Thus, the module group 12 is supplied with the seawater through the branched-off first seawater supply route B11 and the second seawater supply route B2. Meanwhile, the module group 13 is supplied with the seawater through the branched-off first seawater supply route B12 and the third seawater supply route B3.

Since the seawater desalination system 500 is provided with the multiple module groups 12, 13, the seawater desalination system 500 is capable of increasing an amount of freshwater to be produced thereby. In this case, since each of the module groups 12, 13 is supplied with the seawater through the two routes as in the cases of the seawater desalination systems 100 to 400, it is possible to inhibit dirt from locally adhering to the reverse osmosis membranes 11, and to inhibit an decrease in the operational efficiency. Moreover, since the first, second and third seawater supply routes B1, B2, B3 are each provided with the supply pump 21, the efficiency of the seawater desalination system 500 can be increased more, like the seawater desalination system 300 (see FIG. 4).

Figure 7:
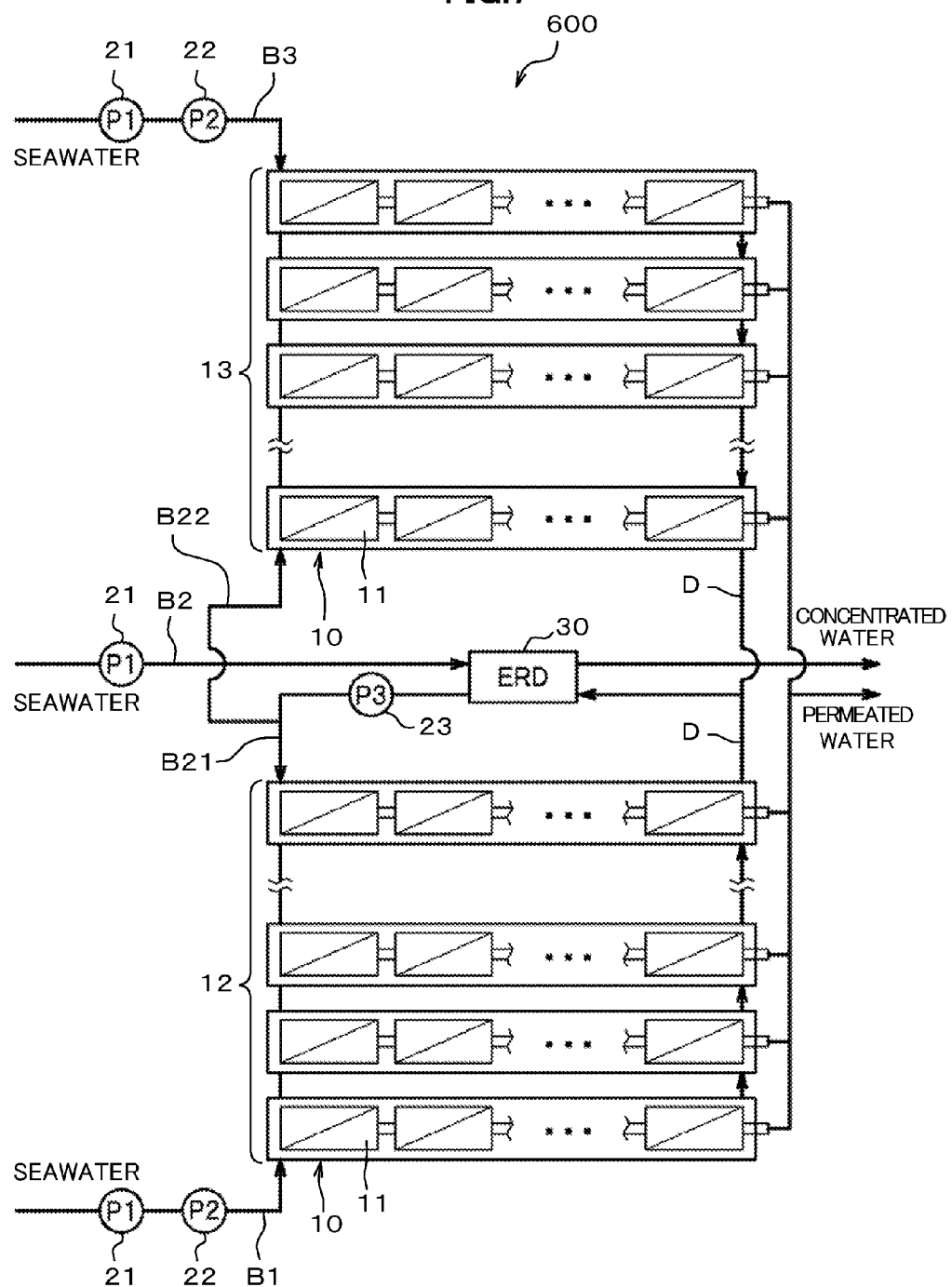
FIG. 7 is a system diagram showing a facility configuration of a seawater desalination system of a sixth embodiment.

FIG. 7 is a system diagram showing a facility configuration of a seawater desalination system 600 of a sixth embodiment. Like the seawater desalination system 500 (see FIG. 6), the seawater desalination system 600 shown in FIG. 7 is provided with two module groups 12, 13. In addition, like in the seawater desalination system 500, these module groups 12, 13 are supplied with the seawater through three routes (a first seawater supply route B1, a second seawater supply route B2 and a third seawater supply route B3).

It should be noted that in the seawater desalination system 600, the seawater flowing through the second seawater supply route B2 is supplied to the ERD 30, unlike in the seawater desalination system 500. After pressurized by the ERD 30, the seawater flows through branched-off second seawater supply routes B21, B22, and is supplied to the module groups 12, 13. Thus, the module group 12 is supplied with the seawater through the first seawater supply route B1 and the branched-off second seawater supply route B21. Meanwhile, the module group 13 is supplied with the seawater through the branched-off second seawater supply route B22 and the third seawater supply route B3. In addition, the concentrated water is recovered from the module groups 12, 13, and is supplied to the ERD 30 in a confluent manner.

The thus-configured seawater desalination system 600 is capable of pressurizing the seawater using a high-pressure pump 22 provided to each of the first and third seawater supply routes B1, B3, to match the seawater therethrough with the pressure of the seawater pressurized by the ERD 30. For this reason, even if dirt locally occurs in the reverse osmosis membrane modules 10 included in the module groups 12, 13 and an amount of pressure loss becomes different among the reverse osmosis membrane modules 10, a reduction in the operational efficiency of the system as a whole can be inhibited by driving the high-pressure pumps 22, 22 corresponding to the difference in the amount of pressure loss.

Figure 8:
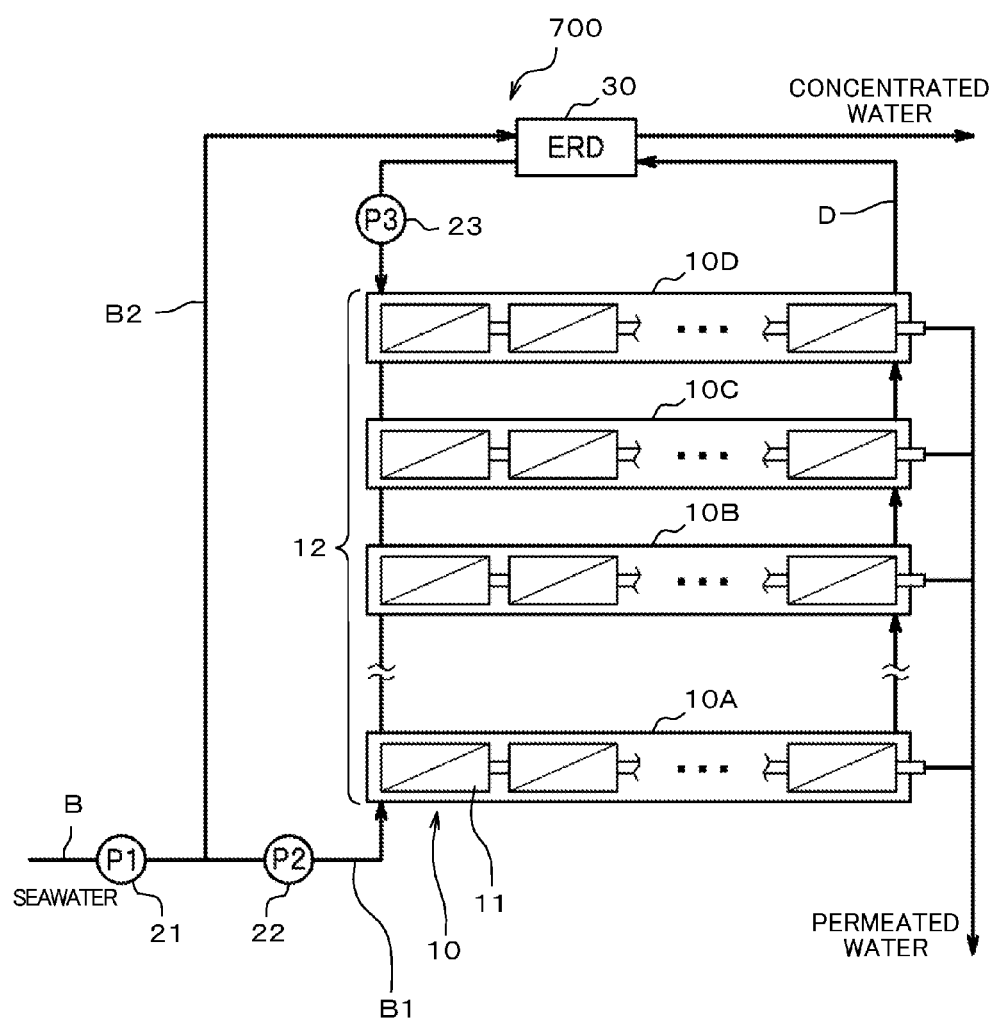
FIG. 8 is a system diagram showing a facility configuration of a seawater desalination system of a seventh embodiment.

FIG. 8 is a system diagram showing a facility configuration of a seawater desalination system 700 of a seventh embodiment. In the seawater desalination system 700 shown in FIG. 8, the module group 12 is supplied with the seawater through two routes, like in the seawater desalination system 100 (see FIG. 1). However, no seawater flows through some area of the parts of the module group 12 supplied with the seawater.

To put it concretely, in the seawater desalination system 700, the seawater from the first seawater supply route B1 is supplied to only reverse osmosis membrane modules 10A, 10B of reverse osmosis membrane modules 10A, 10B, 10C, 10D included in the module group 12. Meanwhile, the seawater from the second seawater supply route B2 is supplied to only the reverse osmosis membrane modules 10C, 10D. Thus, the seawater desalination system 700 is configured such that: the reverse osmosis membrane modules 10A to 10D are connected together using connection flow passages through which the seawater flows; and one of the connection flow passages, that is to say, a connection flow passage connecting the reverse osmosis membrane modules 10C, 10D is disconnected In a case where the ERD 30 is, for example, a displacement-type energy recovery device, it is desirable that the flow rates respectively of the seawater and the concentrated water to be supplied to the ERD 30 be equal to each other. To this end, variation in the flow rate of the supplied seawater among the reverse osmosis membrane modules 10 is inhibited by omitting one of the parts through which the seawater is supplied. Thereby, variation in the flow rate of the discharged concentrated water among the reverse osmosis membrane modules 10 is inhibited as well. Accordingly, it is possible to preferably make the flow rates respectively of the seawater and the concentrated water to be supplied to the ERD 30 become equal to each other.

Although the embodiments have been described referring the drawings, the embodiments are not limited to the illustrated examples at all.

For example, the location of the part which does not allow the seawater to flow through can be changed, for example, by changing inside diameters of the seawater flowing pipes connecting the reverse osmosis membrane modules 10, by controlling a flow rate ratio of the high-pressure pump (s) 22 to the booster bump (s) 23, by providing a flow rate control valve depending on the necessity, or by doing other things.

Furthermore, although in the illustrated examples, the number of reverse osmosis membrane modules 10 used to form each of the module groups 12, 13 is four, the number of reverse osmosis membrane modules 10 used in the configuration is not limited to four. Any number of multiple (two or more) reverse osmosis membrane modules 10 may be used.

Moreover, although in the illustrated examples, each of the module groups 12, 13 is supplied with the seawater through the two routes, each of the module groups 12, 13 may be supplied with the seawater through three or more routes. Similarly, although in the illustrated examples, each reverse osmosis membrane module 10 is supplied with the seawater through the two routes, the reverse osmosis membrane module 10 may be supplied with the seawater through three or more routes. This is the case with the concentrated water as well. The concentrated water may be discharged through three or more routes.

Besides, although in the illustrated example, each of the module groups 12, 13 is shown as being arranged on a plane only in a vertical direction, the reverse osmosis membrane modules 10 may be connected in a direction perpendicular to the drawing pages.

Raw water by the system does not have to be seawater.

DESCRIPTION OF REFERENCE SIGNS

- 10: reverse osmosis membrane module
- 11: reverse osmosis membrane
- 12: module group
- 13: module group
- 21: supply pump (liquid transport pump)
- 22: high-pressure pump (liquid transport pump)
- 23: booster pump (liquid transport pump)
- 30: energy recovery device
- 100: seawater desalination system
- 200: seawater desalination system
- 300: seawater desalination system
- 400: seawater desalination system
- 500: seawater desalination system
- 600: seawater desalination system
- 700: seawater desalination system
- B: seawater supply route
- B1: first seawater supply route (raw water passage)
- B2: second seawater supply route (raw water passage)
- B11: branched-off first seawater supply route (raw water passage)
- B12: branched-off first seawater supply route (raw water passage)
- B21: branched-off second seawater supply route (raw water passage)
- B22: branched-off second seawater supply route (raw water passage)
- D: concentrated water discharge route
- D1: first concentrated water discharge route
- D2: second concentrated water discharge route

What is claimed is:

1. A water treatment system comprising:
   reverse osmosis membrane modules each including a reverse osmosis membrane and a pressure vessel installing the reverse osmosis membrane, the water treatment system configured to obtain permeated water and concentrated water using the reverse osmosis membranes housed in the reverse osmosis membrane modules by supplying raw water to the reverse osmosis membrane modules; and
   a module group including the reverse osmosis membrane modules connected together in parallel, where inputs of ones of the reverse osmosis membrane modules of the module group are interconnected with each other via a connection flow passage, wherein
   the raw water is supplied to each of the reverse osmosis membrane modules by being supplied to the connection flow passage of the module group through at least a first raw water passage and a second raw water passage coming from a raw water supply, where the first raw water passage is connected to a first end portion of the connection flow passage and the second raw water passage is connected to a second end portion of the connection flow passage, where the first end portion and the second end portion of the connection flow passage are at opposing ends of the connection flow passage; and
   the first and second raw water passages are provided with first and second liquid transport pumps, respectively, configured to supply the raw water to the connection flow passage of the module group.

2. The water treatment system according to claim 1, wherein
   at least one of the first and second raw water passages includes an energy recovery device provided therein, and configured to be supplied with the concentrated water discharged from the module group,
   the energy recovery device gives pressure energy of the concentrated water to the raw water supplied to the energy recovery device, and
   the pressure of the raw water to which the pressure energy is given in the energy recovery device is supplied is raised by at least one of the first and second liquid transport pumps.

3. The water treatment system according to claim 2, wherein the inputs of other ones of the reverse osmosis membrane modules of the module group are not interconnected with each other via the connection flow passage.

4. The water treatment system according to claim 3, wherein the concentrated water in the module group is discharged from the module group through a plurality of flow passages.

5. The water treatment system according to claim 2, wherein the concentrated water in the module group is discharged from the module group through a plurality of flow passages.

6. The water treatment system according to claim 1, wherein the inputs of other ones of the reverse osmosis membrane modules of the module group are not interconnected with each other via the connection flow passage.

7. The water treatment system according to claim 6, wherein the concentrated water in the module group is discharged from the module group through a plurality of flow passages.

8. The water treatment system according to claim 1, wherein the concentrated water in the module group is discharged from the module group through a plurality of flow passages.

9. The water treatment system according to claim 1, comprising:
   a controller to control operation of the first and second liquid transport pumps so that output pressures of the raw water on output sides thereof, are substantially equal in pressure to each other.

10. The water treatment system according to claim 1, wherein the inputs of other ones of the reverse osmosis membrane modules of the module group are not interconnected with each other via the connection flow passage, via at least one of: the connection flow passage being disconnected; and a valve provided in the connection flow passage.

* * * * *